US009440490B2

(12) United States Patent
Crockett, Jr.

(10) Patent No.: US 9,440,490 B2
(45) Date of Patent: Sep. 13, 2016

(54) TRAILER AXLE REPAIR KIT HAVING SPARE SPINDLE AND FLANGE AXLE ASSEMBLY

(71) Applicant: Earland M. Crockett, Jr., Yulee, FL (US)

(72) Inventor: Earland M. Crockett, Jr., Yulee, FL (US)

( * ) Notice: Subject to any disclaimer, the term of this patent is extended or adjusted under 35 U.S.C. 154(b) by 149 days.

(21) Appl. No.: 14/338,171

(22) Filed: Jul. 22, 2014

(65) Prior Publication Data
US 2016/0023513 A1    Jan. 28, 2016

(51) Int. Cl.
*B60B 35/00* (2006.01)
*B60B 27/02* (2006.01)
*B60B 35/02* (2006.01)
*B60B 35/04* (2006.01)

(52) U.S. Cl.
CPC ............ *B60B 27/02* (2013.01); *B60B 35/004* (2013.01); *B60B 35/025* (2013.01); *B60B 35/04* (2013.01); *B60B 2900/541* (2013.01); *B60Y 2200/14* (2013.01)

(58) Field of Classification Search
None
See application file for complete search history.

(56) References Cited

U.S. PATENT DOCUMENTS

| 743,629 | A | 11/1903 | Clark | |
| 4,768,839 | A * | 9/1988 | Spindler | B23K 20/129 |
| | | | | 301/124.1 |
| 5,226,691 | A | 7/1993 | Kane | |
| 5,401,080 | A | 3/1995 | Wenzel | |
| 5,560,629 | A | 10/1996 | Smith | |
| 6,024,418 | A | 2/2000 | Ebert | |
| 6,431,659 | B1 | 8/2002 | Somppi | |
| 6,926,371 | B1 | 8/2005 | Gagnon | |
| 7,234,783 | B2 * | 6/2007 | MacKarvich | B60B 35/02 |
| | | | | 301/124.1 |
| 2010/0244546 | A1 * | 9/2010 | Milio | B60B 37/04 |
| | | | | 301/126 |
| 2010/0289262 | A1 * | 11/2010 | Kobayashi | F16L 23/0286 |
| | | | | 285/363 |

FOREIGN PATENT DOCUMENTS

EP    1209007    2/2005

* cited by examiner

*Primary Examiner* — Brodie Follman
*Assistant Examiner* — Hilary L Johns
(74) *Attorney, Agent, or Firm* — Patent CEO, LLC; Phillip Vales

(57) ABSTRACT

A spare stub assembly has a circular flange attached to a spindle that has been inserted within a hole centrally located in the central flange. A set of holes are disposed symmetrically about the large flat surface of the flange. The back end of the spindle is placed within a tubular member that has a corresponding second flange attached at an end thereof. This second flange likewise has a central hole and a set of holes disposed symmetrically about the large flat surface of the second flange. The back end of the spindle is inserted within the hole in the second flange associated with the tubular member and onwards therein; this is followed by the bolts and locking nuts application between the two sets of flanged holes thereby locking the two flanges together and permitting easy replacement of a worn spindle. Another spare stub assembly attached similarly to a third flange that is itself attached to the other end of the tubular member opposite the first flange is an option.

2 Claims, 8 Drawing Sheets

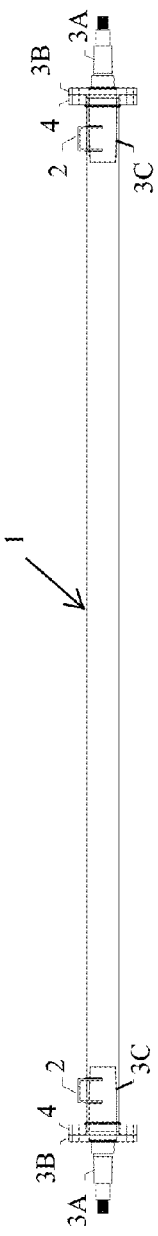
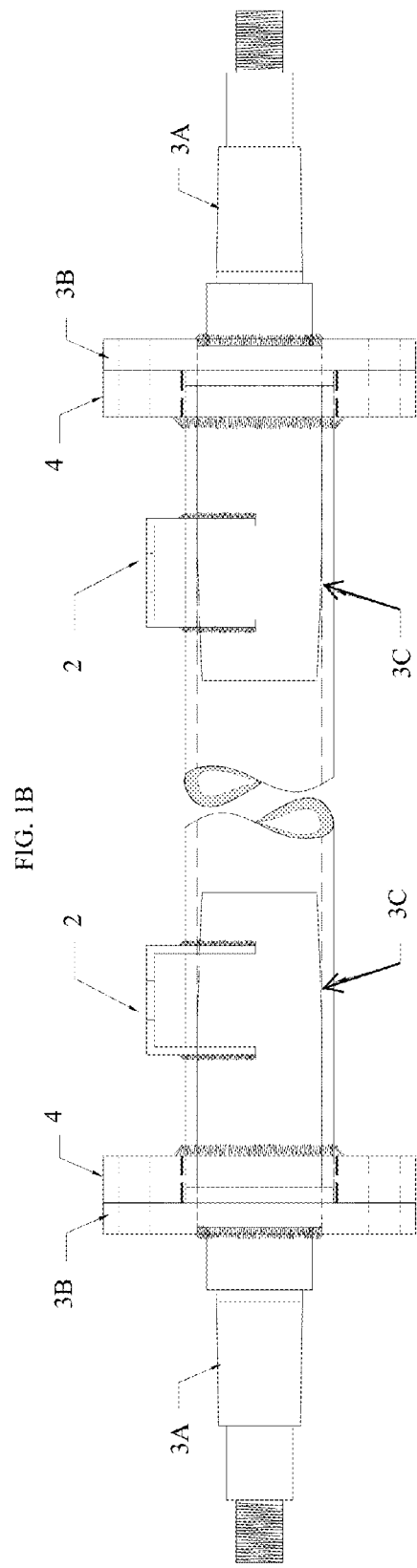
FIG. 1A
FIG. 1B

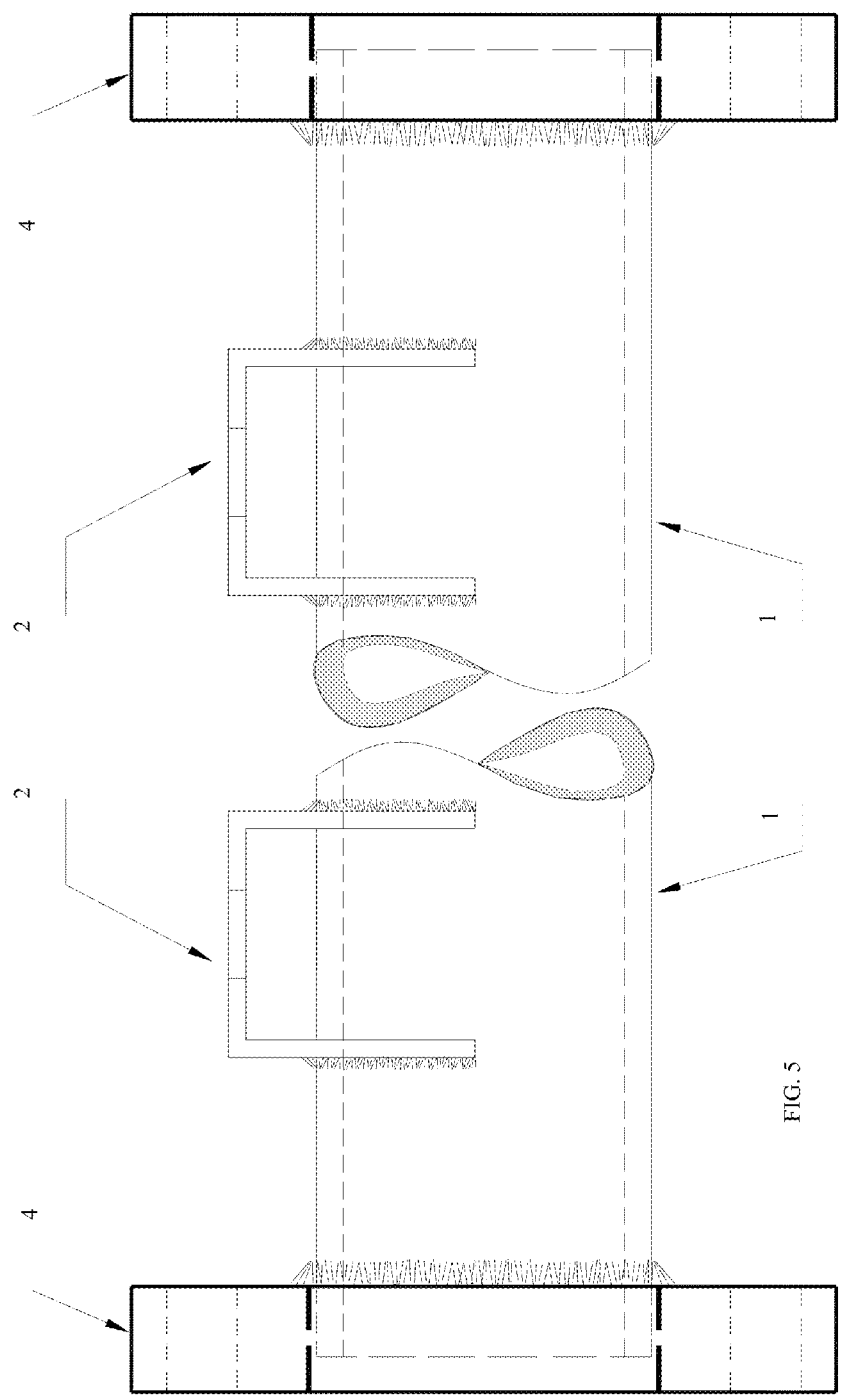

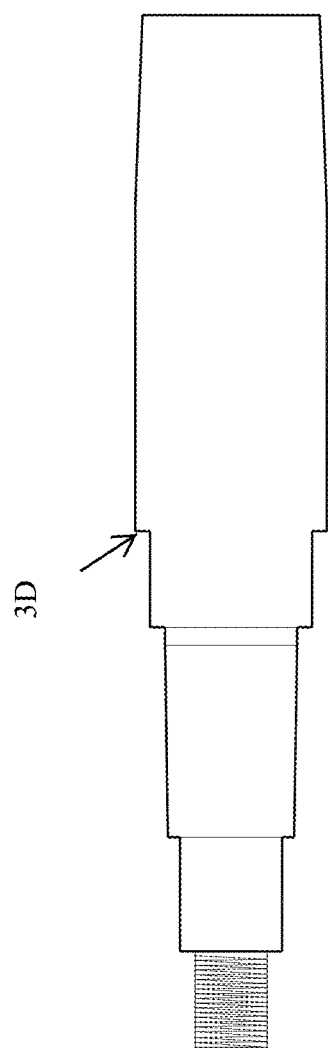

TRAILER AXLE REPAIR KIT HAVING SPARE SPINDLE AND FLANGE AXLE ASSEMBLY

FIELD OF THE INVENTION

The present invention relates to an trailer and or truck axles and their associated spindle. More particularly, the present invention relates to a novel mechanism by which a worn and or damaged spindle can be remediated.

BACKGROUND OF THE INVENTION

Most trailers utilize some form of rotational support structure. Typically this support is a central shaft for a rotating wheel or gear otherwise known as an axle. There are several types of axles currently available in various types of environments. Amongst those found on wheeled vehicles, there are two primary types; namely, a fixed wheel to axle and a rotating wheel on fixed to vehicle axle. The first, as its name implies has the axle fixed to the wheels so that axle rotates along with them; the second type has the axle fixed to the vehicle, such that the wheels rotate around the axle and are not fixedly attached thereto.

In the first case, there are bearings or bushing provided at the mounting points where the axle is supported. In the latter case, a bearing or bushing sits inside a central hole in the wheel thereby permitting the wheel or gear to rotate around the axle. There are various other types of axles currently available. It should be noted that a spindle or arm is fixedly attached to the end of the axle by welding in the latter case (rotating wheel on fixed to vehicle axle) such that the wheel can rotate thereupon.

However, a problem arises when the spindle becomes damage as it is difficult for there to be a simple repair solution to this problem for users in an off road or difficult environment. Additionally, past solutions have required the worn or damage spindle to be removed by welding torch requiring a great deal of down time. Further, it is desirable that the solution be cost effective and easy for a user to correct as it is costly to replace the worn or damaged spindle even sometimes necessitating the replacement of the entire axle itself.

Accordingly, there needs to be some solution to overcome the aforementioned problems.

SUMMARY OF THE INVENTION

The present invention overcomes the deficiencies of the known art and the problems that remain unsolved by providing a spare stub assembly an axle assembly as described herein below.

The following embodiments describe the concepts disclosed herein and sought for protection of Letters Patent:

A vehicular axle spindle system comprising:
a spare stub spindle assembly attached to
a first flange attached at an end of
a tubular member and
wherein the spare stub spindle assembly further comprises:
a third flange having a spindle attached thereto at a hole within the third flange and wherein the spindle further comprises a back side and a staircase side and wherein the staircase side protrudes from one end of the third flange and the back side protrudes from an opposite side.

A vehicular axle spindle system comprising:
a spare stub spindle assembly attached to
a first flange attached at an end of
a tubular member and
wherein the spare stub spindle assembly further comprises:
a third flange having a spindle attached thereto at a hole within the third flange and wherein the spindle further comprises a back side and a staircase side and wherein the first flange further comprises a central hole therein and wherein the back side of the spindle is inserted within the tubular member.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which:

FIG. 1A is an illustration of a front elevation of an axle assembly having an axle with integral circular flanges and mounting brackets as well as a spare stub axle spindle assembly in an embodiment.

FIG. 1B is a drawing of an exploded front elevation of an axle assembly having an axle with integral circular flanges and mounting brackets as well as a spare stub axle spindle assembly in an embodiment.

FIG. 5 is a depiction of an exploded front view of an axle assembly having flanges welded on opposite sides thereof in an embodiment.

FIG. 6 is an illustration of a side view of a stub axle spindle without an associated flange in an embodiment.

Like reference numerals refer to like parts throughout the several views of the drawings.

DETAILED DESCRIPTION

Figure 2B:
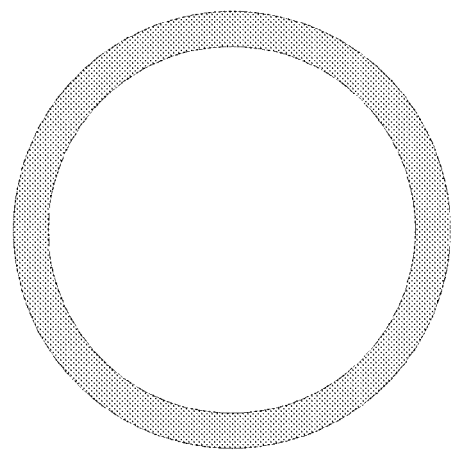
FIG. 2B is an illustration of an side view of an axle pipe without the circular flanges in an embodiment.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in each figure. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

As previously implied, there are inherent limitations associated with a one piece axle design in that if damaged, the spindle is difficult, costly and time consuming to repair in the field. Thus, the general purpose of the present embodiment is to eliminate the need to replace the entire axle when a spindle becomes damaged (such as when a bearing burns out and the hub assembly falls off mid transit). The present embodiment substantially departs from the conventional trailer axle designs of the prior art in that it utilizes bolt on spindles having an integrated flange that can be replaced in the field without the need for equipment to cut off the old spindle and weld on a new spindle to the trailer axle. This has the intended effect of ensuring a quick and easy field repair for a truck, trailer owner or operator.

FIG. 1A is an illustration of a front elevation of an axle assembly having an axle, with integral circular flanges and mounting brackets as well as a spare stub axle spindle assembly in an embodiment. An axle 1 is a hollow or solid tube having two ends and further having two square or rectangular mounting brackets 2 disposed near either end thereof. These two mounting brackets 2 are each located before one of two integral circular flanges 4 that are themselves located concentrically at either end of the axle 1; thus, the circular flanges 4 are welded at the end of the axle and the brackets 2 are located a short distance towards the center of the axle on the surface thereof of either side of axle 1.

The brackets 2 and the flanges 4 are each welded to the respective surface of the axle 1 such that the axle 1 tube, brackets 2 and flanges 4 form an axle assembly. Additionally, each of the spindles 3A is welded to one of the spare stub circular flanges 3B once it is inserted through a central hole within the flanges 3B; it can help to think of the flanges 3B as a donut shaped or annulus device. The weld 6 is a circular one about the first forward staircase edge 3D of the spindle nearest the back end 3C thereof. For simplicity, a spindle 3A and a flange 3B form a 'spare stub assembly' although there are other structures thereon that are described herein that are also included in this assembly; for example a raised lip on the flange, a set of stairs on the spindle, a threaded end thereof etc. These back ends 3C of each spindle sits within the axle 1 on either side thereof such that the back end 3C helps to stabilize the spare stub assembly as it is prepared for mounting to the axle assembly by locking bolts and nuts.

It should be understood that the forward staircase edge 3D of the spindle is positioned and welded a short distance within the donut or annulus hole in the center of the flanges 3B that is opposite the side having the raised lip 3E; thus, the weld is within the inner surface of each annulus hole of the flanges 3B such that weld material forms a flush surface with the rest of the circular platter surface of the flanges 3B. Finally, each of the spare stub circular flanges 3B has a raised circular lip 3E that rises about the central donut or annulus hole and that sits about the back end 3C of the spindle. The outer circular surface of the raised circular lips 3E are made to directly abut the inner surface of the axle flange 4 inside the central annular hole and optionally of the axle 1 tube circular end thereby adding stability to the overall device. Thus, when the back end 3C is inserted within the tube of the axle 1 the raised lip 3E is inserted in circular hole found in the center of the axle flanges 4 that match the aforementioned lip 3E; this further provide mounting support for a user as it helps a user to present the spare stub assembly for attachment of the device to the axle 1.

FIG. 1B is a drawing of an exploded front elevation of an axle assembly having an axle with integral circular flanges and mounting brackets as well as a spare stub axle spindle assembly in an embodiment. This drawing shows a closeup of everything shown in FIG. 1A as well as the weld points described below. An axle 1 is a hollow or solid tube having two ends and further having two square or rectangular mounting brackets 2 disposed near either end thereof. These two mounting brackets 2 are each located before one of two integral circular flanges 4 that are themselves located concentrically at either end of the axle 1. Thus, the circular flanges 4 are welded at the end of the axle and the brackets 2 are located a short distance towards the center of the axle on the surface thereof of either side of axle 1.

The brackets 2 and the flanges 4 are each welded to the respective surface of the axle 1 such that the axle 1 tube, brackets 2 and flanges 4 form an axle assembly. Circular welds 5 are made between the back of each of the circular flanges and the axle 1 on either end thereof. It should be understood that the circular flanges 4 each have a center cutout so as to make the flanges 4 into a donut or annulus shape; this permits the back end 3C of the spindle to be inserted therein and on into the hollow tube of the axle 1. Finally, a group of holes 7 perforating both the spare stub flanges 3B and the integral axle flanges 4; these holes 7 serve to enable a locking mechanism (bolt-nut etcetera) to secure the spare spindle assembly to the axle flange thereon.

Figure 2A:
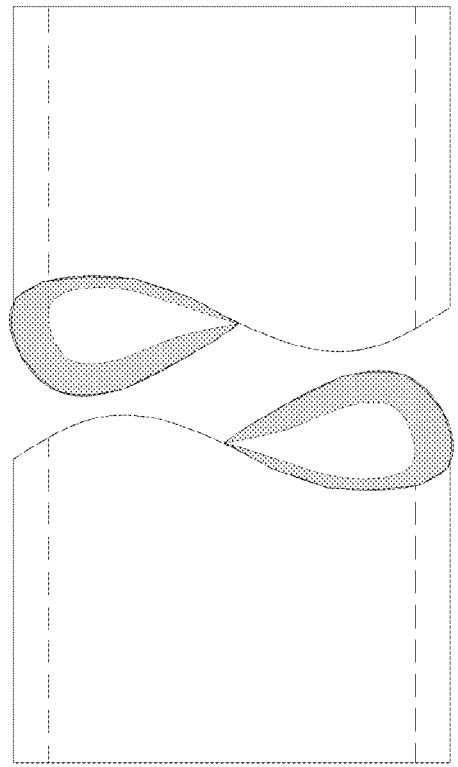
FIG. 2A is a depiction of a front elevation view of a portion of an axle pipe without the circular flanges in an embodiment.

FIG. 2A is a depiction of a front elevation view of a portion of an axle pipe without the circular flanges in an embodiment.

FIG. 2B is an illustration of an side view of an axle pipe without the circular flanges in an embodiment.

Figure 3B:
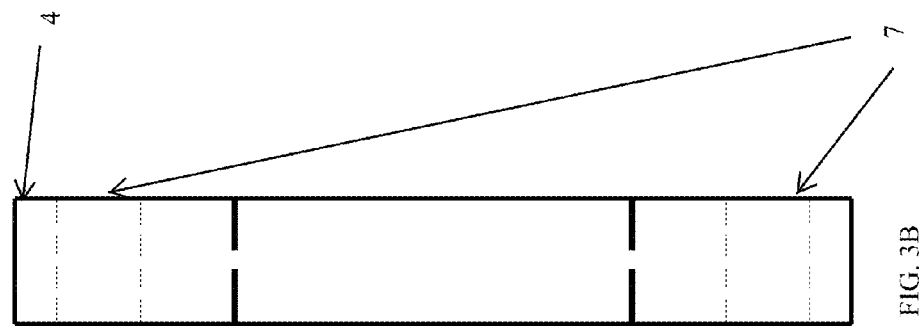
FIG. 3B is a depiction of a side cross section view of an axle flange without the axle in an embodiment.
Figure 3A:
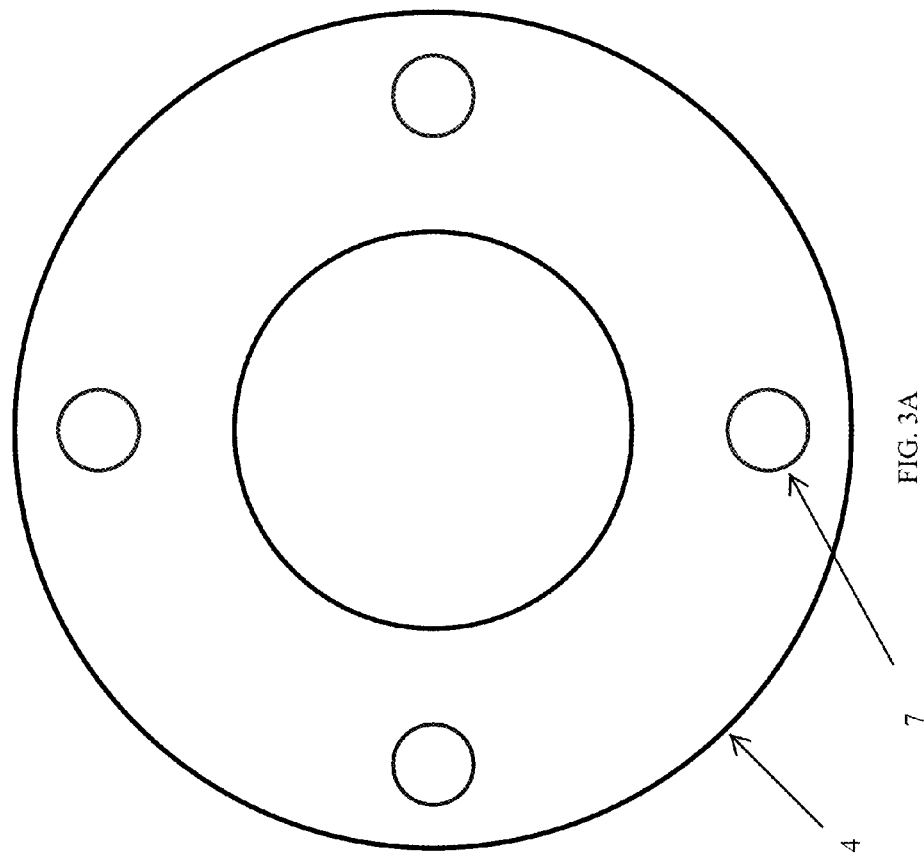
FIG. 3A is a drawing of a front elevation view of an axle flange without the axle in an embodiment.

FIG. 3A is a drawing of a front elevation view of an axle flange without the axle in an embodiment. Four holes 7 are shown symmetrically disposed about the surface of the axle flange 4. It should be understood that the circular flanges 4 each have a center cutout so as to make the flanges 4 into a donut or annulus shape; this permits the back end 3C of the spindle to be inserted therein and on into the hollow tube of the axle 1. Finally, a group of holes 7 perforating both the spare stub flanges 3B and the integral axle flanges 4; these holes 7 serve to enable a locking mechanism (bolt-nut etcetera) to secure the spare spindle assembly to the axle flange thereon.

FIG. 3B is a depiction of a side cross section view of FIG. 3A about a centerline therein of an axle flange without the axle in an embodiment. Four holes 7 are shown symmetrically disposed about the surface of the axle flange 4.

Figure 4B:
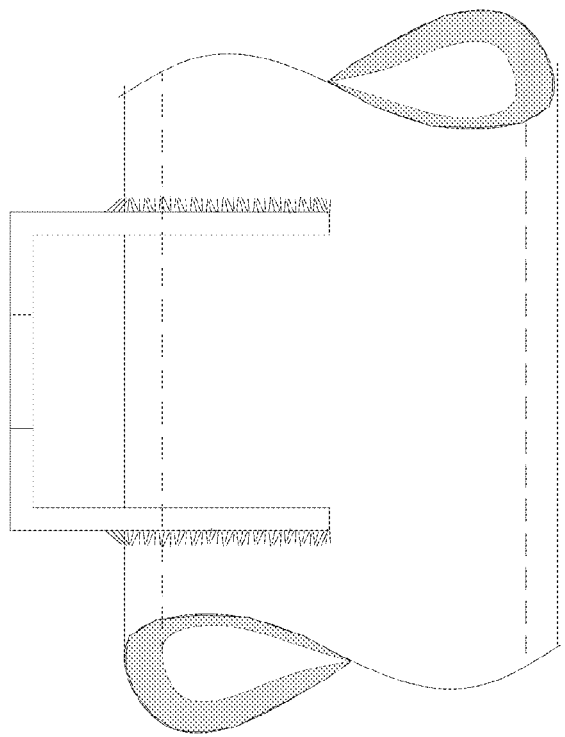
FIG. 4B is a drawing of a front view of an axle having mounting brackets welded thereto for application to the trailer frame in an embodiment.
Figure 4A:
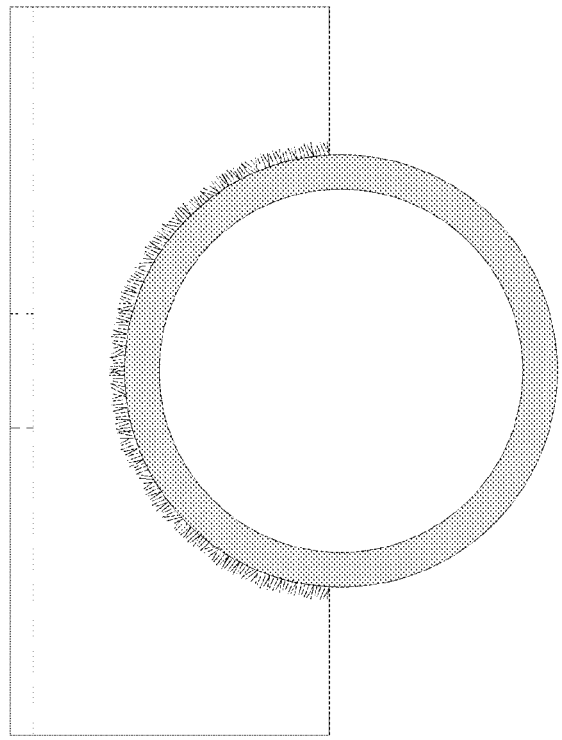
FIG. 4A is an illustration of a side view of an axle having mounting brackets welded thereto for application to the trailer frame in an embodiment.

FIG. 4A is an illustration of a side view of an axle having mounting brackets welded thereto for application to the trailer frame in an embodiment.

FIG. 4B is a drawing of a front view of an axle having mounting brackets welded thereto for application to the trailer frame in an embodiment.

FIG. 5 is a depiction of an exploded front view of an axle assembly having flanges welded on opposite sides thereof in an embodiment.

FIG. 6 is an illustration of a side view of a stub axle spindle without an associated flange in an embodiment. The spindle displays from left to right a threaded end, a sequence of stairs and a back end thereon.

Figures 7A, 7B:
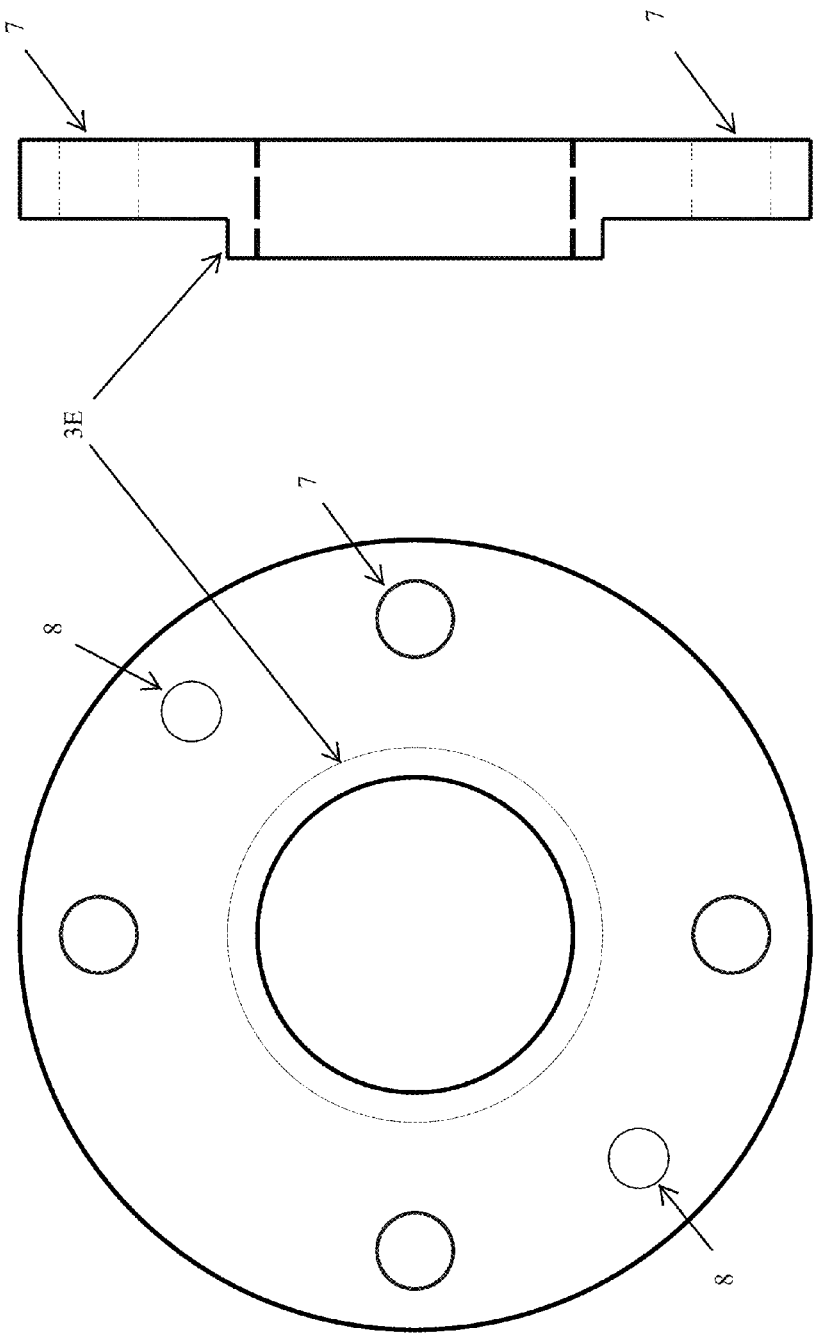
FIG. 7A is a drawing of a front view of a flange without a stub axle spindle; it should be noted that this view shows two extra holes for jacking bolts (not shown) to help in the removal thereof in an embodiment.
FIG. 7B is depiction of a side cross section view of a flange without a stub axle spindle.

FIG. 7A is a drawing of a front view of a flange 3B separate from its associated stub axle spindle 3A, 3C. It should be noted that this view shows two threaded holes 8 arranged opposite each other and between two mounting holes 7; these threaded holes are used in combination with jacking bolts (not shown) to push the flange 3B away from the axle flange 4 in the event that rust or other material sets between the faces of the two flanges 3B, 4 locking the two in place; thus, this helps in the removal of the spare stub axle spindle flange 3B from the axle assembly flange 4. A user would insert jacking bolts (not shown) in the threaded hole 8 and twist them therein until the impact of those bolts against the surface of the axle flange 4 is such that it disengages the flange 3B from the flange 4.

FIG. 7B is depiction of a cross section view about a centerline of the FIG. 7A of a flange without a stub axle spindle. Each of the spare stub circular flanges 3B has a raised circular lip 3E that rises about the central donut or annulus hole and that sits about the back end 3C of the spindle. The outer circular surface of the raised circular lips 3E are made to directly abut the inner surface of the axle flange 4 inside the central annular hole and optionally of the axle 1 tube circular end thereby adding stability to the overall device. Thus, when the back end 3C is inserted within the tube of the axle 1 the raised lip 3E is inserted in circular hole found in the center of the axle flanges 4 that match the aforementioned lip 3E; this further provide mounting support for a user as it helps a user to present the spare stub assembly for attachment of the device to the axle 1.

Figure 8:
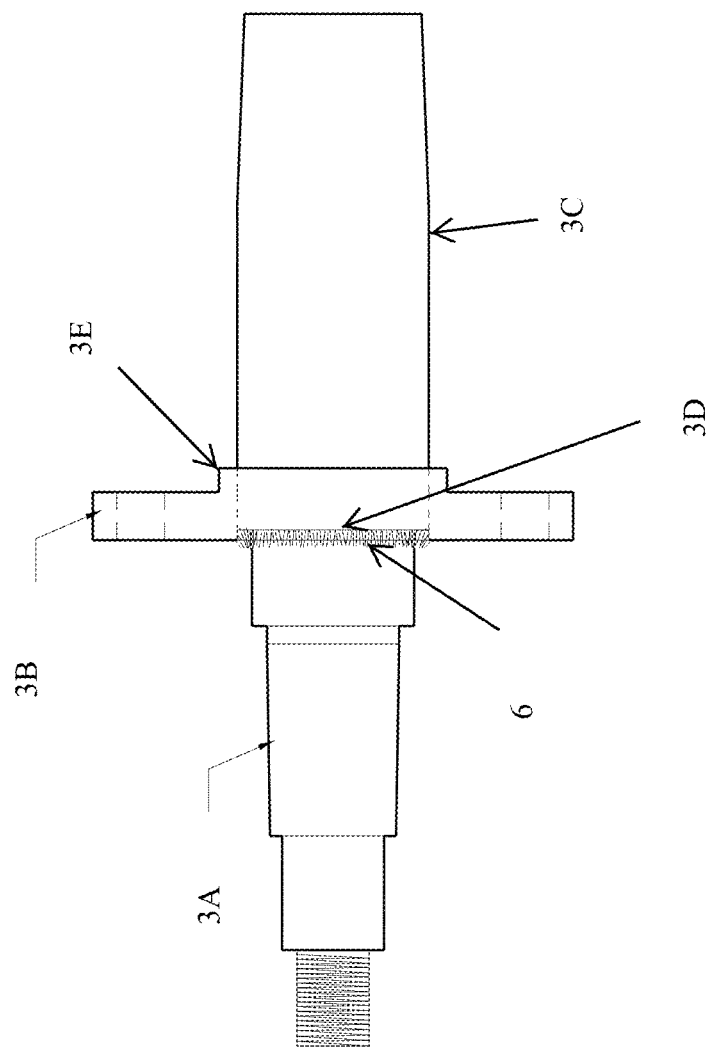
FIG. 8 is an illustration of a side view of a stub axle spindle with welded flange thereon in an embodiment.

FIG. 8 is an illustration of a side view of a stub axle spindle with welded flange thereon in an embodiment. It should be understood that the forward staircase edge 3D of the spindle is positioned and welded a short distance within the donut or annulus hole in the center of the flanges 3B that is opposite the side having the raised lip 3E; thus, the weld is within the inner surface of each annulus hole of the flanges 3B such that weld material forms a flush surface with the rest of the circular platter surface of the flanges 3B. Finally, each of the spare stub circular flanges 3B has a raised circular lip 3E that rises about the central donut or annulus hole and that sits about the back end 3C of the spindle.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as exemplary modes for carrying out this invention, but that the invention will include all the embodiments falling within the scope of the appended claims.

What is claimed is:

1. A vehicular axle spindle system comprising:
a spare stub spindle assembly attached to
a first flange attached at an end of
a tubular member and
wherein the spare stub spindle assembly further comprises:
a third flange having a spindle attached thereto at a hole within the third flange and wherein the spindle further comprises a back side and a staircase side and wherein the staircase side protrudes from one end of the third flange and the back side protrudes from an opposite side.

2. A vehicular axle spindle system comprising:
a spare stub spindle assembly attached to
a first flange attached at an end of
a tubular member and
wherein the spare stub spindle assembly further comprises:
a third flange having a spindle attached thereto at a hole within the third flange and wherein the spindle further comprises a back side and a staircase side and wherein the first flange further comprises a central hole therein and wherein the back side of the spindle is inserted within the tubular member.

* * * * *